United States Patent
Zinner (10) Patent No.: US 10,821,895 B2
(45) Date of Patent: Nov. 3, 2020

(54) APPARATUS AND METHOD FOR CHECKING THE PLAYBACK OF A VIDEO SEQUENCE OF A MIRROR REPLACEMENT CAMERA

(71) Applicant: Continental Automotive GmbH, Hannover (DE)

(72) Inventor: Helge Zinner, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/478,247

(22) PCT Filed: Apr. 6, 2018

(86) PCT No.: PCT/DE2018/200034
§ 371 (c)(1),
(2) Date: Jul. 16, 2019

(87) PCT Pub. No.: WO2018/206059
PCT Pub. Date: Nov. 15, 2018

(65) Prior Publication Data
US 2019/0359132 A1    Nov. 28, 2019

(30) Foreign Application Priority Data
May 9, 2017 (DE) .......................... 10 2017 207 792

(51) Int. Cl.
*B60R 1/00* (2006.01)
*B60R 11/04* (2006.01)
(Continued)

(52) U.S. Cl.
CPC ................ *B60R 1/00* (2013.01); *B60R 11/04* (2013.01); *H04N 5/23299* (2018.08);
(Continued)

(58) Field of Classification Search
CPC ... B60R 11/04; B60R 1/00; B60R 2001/1253; B60R 2011/004; B60R 2011/008;
(Continued)

(56) References Cited

U.S. PATENT DOCUMENTS 6,593,960 B1    7/2003    Sugimoto et al.
6,801,249 B1   10/2004    Gobbo
(Continued)

FOREIGN PATENT DOCUMENTS

DE    600 25 864    8/2006
DE   102009023435   1/2010
(Continued)

OTHER PUBLICATIONS

PCT Examiner Edward Cooke, English translation of the International Search Report of the International Searching Authority for International Application PCT/DE2018/200034, dated Jul. 18, 2018, 2 pages, European Patent Office, HV Rijswijk, Netherlands.
(Continued)

*Primary Examiner* — Jessica M Prince
(74) *Attorney, Agent, or Firm* — W. F. Fasse (57) ABSTRACT

An apparatus for checking the playback of a video sequence of a mirror replacement camera for a motor vehicle includes: a movable camera device (10), which is designed to record an image and to provide image data; an image data processing device (20), which is coupled to the camera device (10) and is designed to produce the video sequence based on the captured image data; an output device (30), which is designed to display the produced video sequence; and a diagnosis device (40), which is designed to move the camera device (10) and/or to generate an image movement when producing the video sequence so as to check the displayed video sequence.

18 Claims, 10 Drawing Sheets

(51) Int. Cl.
*H04N 5/232* (2006.01)
*H04N 17/00* (2006.01)
*B60R 1/12* (2006.01)
*B60R 11/00* (2006.01)

(52) U.S. Cl.
CPC .... *H04N 17/002* (2013.01); *B60R 2001/1253* (2013.01); *B60R 2011/004* (2013.01); *B60R 2011/008* (2013.01); *B60R 2300/30* (2013.01); *B60R 2300/402* (2013.01); *B60R 2300/8046* (2013.01)

(58) Field of Classification Search
CPC .......... B60R 2300/30; B60R 2300/402; B60R 2300/8046; H04N 17/002; H04N 5/23238; H04N 5/23299; H04N 7/183
See application file for complete search history.

(56) References Cited

U.S. PATENT DOCUMENTS

| | | | |
|---|---|---|---|
| 9,393,917 B2 | 7/2016 | Hughes et al. | |
| 10,000,154 B2 | 6/2018 | Schondorf et al. | |
| 2006/0093998 A1 | 5/2006 | Vertegaal | |
| 2013/0155236 A1* | 6/2013 | Ramdeo | B60R 1/00 348/148 |
| 2013/0188032 A1 | 7/2013 | Vertegaal | |
| 2015/0302742 A1* | 10/2015 | Schuller | G08G 1/017 340/933 |
| 2015/0314736 A1* | 11/2015 | Hughes | B60R 11/04 348/148 |
| 2016/0011657 A1* | 1/2016 | Estacio | G06F 3/013 345/156 |
| 2016/0119586 A1 | 4/2016 | Riad et al. | |
| 2016/0140403 A1* | 5/2016 | Nagata | B60R 11/04 382/104 |
| 2018/0032822 A1* | 2/2018 | Frank | G06K 9/00791 |
| 2019/0299782 A1* | 10/2019 | Yamashita | G03B 15/00 |

FOREIGN PATENT DOCUMENTS

| | | |
|---|---|---|
| DE | 102014106035 | 11/2015 |
| DE | 102015111773 | 2/2016 |
| WO | WO 2015/062602 | 5/2015 |

OTHER PUBLICATIONS

PCT International Preliminary Report on Patentability including English Translation of PCT Written Opinion of the International Searching Authority for International Application PCT/DE2018/200034, dated Nov. 12, 2019, 5 pages, International Bureau of WIPO, Geneva, Switzerland.

German Office Action in German Patent Application No. 10 2017 207 792.1, dated Dec. 21, 2017, 7 pages, with partial English translation, 4 pages.

* cited by examiner

APPARATUS AND METHOD FOR CHECKING THE PLAYBACK OF A VIDEO SEQUENCE OF A MIRROR REPLACEMENT CAMERA

TECHNICAL FIELD

The present invention relates to systems for replacing exterior and interior mirrors.

In particular, the present invention relates to an apparatus and a method for checking the playback of a video sequence of a mirror replacement camera for a motor vehicle.

TECHNICAL BACKGROUND

Exterior and interior mirrors can increasingly be replaced by camera monitor systems. Such mirror replacement systems comprise a camera and a monitor and replace, for example, exterior and interior mirrors for motor vehicles.

In addition to advantages in terms of aerodynamics and the associated reduced consumption, this also results in technical improvements which are only made possible by deploying cameras.

Thus, images of multiple cameras can be fused or respectively mounted together into a panoramic view system, troublesome distortions or image effects can be excluded and dazzling of the car driver can be avoided.

In order to replace the standard mirrors and, thus, achieve a virtually 100% functioning system, extended functions have to be developed for the camera and representation so as to make the system failsafe. Known problems which do not affect conventional mirrors, but which do affect the mirror replacement system all the more include the freezing of images during the representation as a result of errors in the image processing system.

It is true that when driving on a road the driver should very quickly recognize whether such an error exists, however in the case of a background which only changes slowly or not at all, as is the case of a car pulling out of or into a parking space, a still image might also be an error of the mirror replacement system.

The driver looks at the mirror monitor, for example, and sees that there is no danger and moves out of the space. However, the image might have been a still image at this moment.

SUMMARY OF THE INVENTION

It is an object of the present invention to provide an improved camera function for a driver assistance system.

This object can be achieved by the subject matter of the independent claims. Further developments and embodiments can be inferred from the dependent claims, the description and the figures of the drawings.

A first aspect of the present invention relates to an apparatus for checking the playback of a video sequence of a mirror replacement camera for a motor vehicle.

The apparatus comprises a movable camera device, which is designed to record an image and to provide image data; additionally an image data processing device, which is coupled to the camera device and is designed to produce the video sequence on the basis of the captured image data; additionally an output device, which is designed to display the produced video sequence; and additionally a diagnosis device, which is designed to move the camera device and/or to generate an image movement when producing the video sequence so as to check the displayed video sequence.

The present invention proposes for example a technical system and a method so as to recognize the freezing of video images in camera monitor systems for a motor vehicle.

The present invention proposes, for example, an automatic and autonomously repeating test.

The present invention proposes, for example, identifying still or respectively frozen images of the mirror replacement system by means of camera or image movements and by a comparison of images.

In addition, the method constitutes a possibility of indicating hazards to the driver.

The present invention is provided for mirror replacement systems, in which it is also especially necessary to increase the functional safety.

The proposed processes and methods make it possible to reduce the probability of the mirror replacement system failing.

When errors occur as a result of images freezing, the system can now, on the one hand, remedy itself or respectively diagnose an error and, on the other hand, the driver can be given confidence in the technology and the new system.

This leads to better acceptance of the digital systems for mirror replacement applications.

The present invention helps to increase the safety of the imaging camera systems, which will become more and more important in automobiles. The present invention can be transferred to other imaging systems in the vehicle, for example radar or ultrasound-based imaging sensor systems.

The present invention offers solutions for increasing the safety of cameras or mirror replacement systems. The present invention can additionally avoid accidents caused by technical systems, indicate to the driver or occupant that an error is (not) present, and create confidence in safe systems.

In an advantageous embodiment of the present invention, it is provided that the diagnosis device is designed to check the displayed video sequence if eye contact of an occupant with the output device has been captured.

In an advantageous embodiment of the present invention, it is provided that the diagnosis device is designed to check the displayed video sequence if a predetermined triggering event has been established. A driving situation, a driving condition, an action of the driver or a system check which is to be carried out periodically can be provided as the triggering event.

In an advantageous embodiment of the present invention, it is provided that the diagnosis device is designed to check the displayed video sequence repeatedly within predetermined periods of time.

In an advantageous embodiment of the present invention, it is provided that the diagnosis device is designed to check the displayed video sequence on the basis of prevailing driving situations and/or vehicle states.

In an advantageous embodiment of the present invention, it is provided that the movable camera device is designed to move the field of view of the camera so as to alter the recorded image. In other words, the camera device is swiveled, for instance moved about a predetermined angular range.

The described configurations and further developments can be combined in any way with one another.

Further possible configurations, further developments and implementations of the present invention also comprise combinations of features of the present invention, which are described above or below with respect to the embodiments, including those which are not explicitly indicated.

The appended drawings are intended to provide a further understanding of the embodiments of the present invention.

The appended drawings illustrate embodiments and, in connection with the description, serve to explain concepts of the present invention.

Other embodiments and many of the indicated advantages are set out with respect to the figures of the drawings. The represented elements of the figures of the drawings are not necessarily shown to scale with respect to one another.

DETAILED DESCRIPTION OF EXEMPLARY EMBODIMENTS

In the figures of the drawings, the same reference numerals denote elements, parts or components or method steps which are the same or which have the same function, unless otherwise indicated.

The motor vehicle or respectively vehicle is, for example, a motor vehicle or a hybrid vehicle, for example a hybrid vehicle having a coasting function, for example a motorcycle, a bus or a truck or a bicycle.

An apparatus for checking the playback of a video sequence of a mirror replacement camera can be used for further camera-based and sensor-based systems.

In principle, the method can also be transferred to a radar or lidar sensor and the apparatus for checking the playback of a video sequence can be deployed during this.

The sensor does not have to be movable as such since it can also be provided that the vehicle is utilized as such as a movable object, or a part of the vehicle—door, electric window, taillight, turn signal light—is utilized as a movable object depending on the scale of the recorded image.

Figure 1:
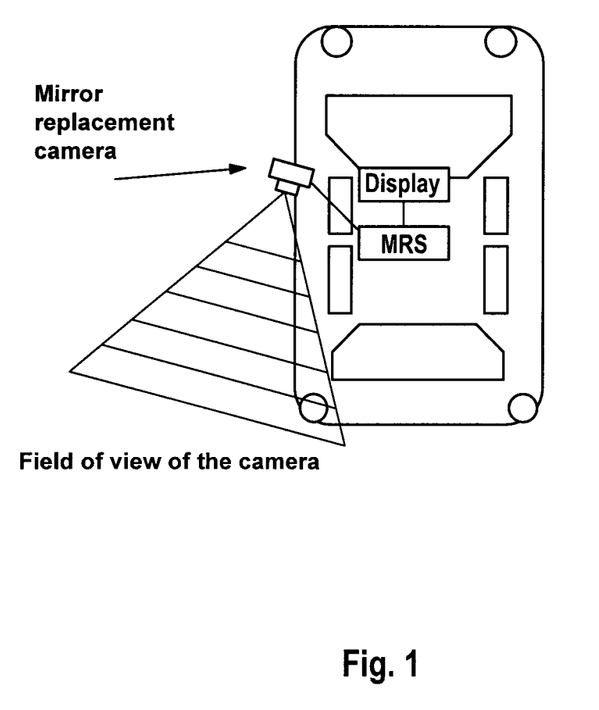
FIG. 1: shows a schematic representation of the entire system having a camera, also abbreviated to MRS for Mirror Replacement System, in order to explain the present invention.

FIG. 1 shows a schematic representation of a description of the entire system having a camera, a Mirror Replacement System, also abbreviated to MRS, in order to explain the present invention.

FIG. 1 shows a camera or a camera device which is installed in a vehicle and which has a specific viewing range or respectively a field of view.

Additionally, an image data processing device, an MRS, and a display in the form of an output device for displaying the image data or respectively the video sequence are represented.

Figure 2:
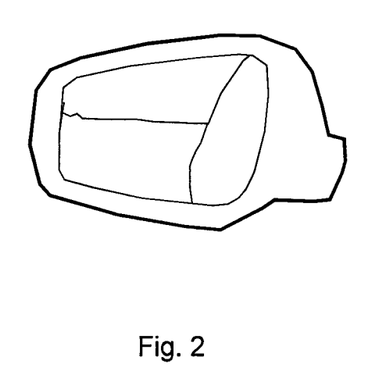
FIG. 2: shows a schematic representation of a mirror replacement camera in order to explain the present invention.

FIG. 2 shows a schematic representation of a mirror replacement camera in order to explain the present invention.

FIG. 2 shows an exemplary view of a mirror camera.

A part or a partial region of the vehicle is generally also visible—or respectively such an environment should be visible so that the driver can better orient himself regarding what the camera is directed at.

The represented method describes a system:

i) which records various full images and compares these with one another over time; and/or ii) which automatically aligns or moves the camera and which compares the images with one another.

The present invention proposes a mechanism which provides that the camera is moved during operation and while images are displayed on the screen so as to check the display and the entire system. Multiple cameras can additionally be actuated accordingly and checking movements can be carried out with said cameras.

The camera or respectively the lens is, for example, moved to the left or right so as to record another scene. The camera thus focuses on new objects, even in the case of stationary scenery, that is to say when there is no movement of the vehicle or other objects in the recorded scenery.

An image is therefore recorded which is different from the previous image which was recorded prior to the movement.

For example, the camera can be aligned in the direction of the vehicle body as a background is always to be expected here.

Said background can also be prestored and can also be clearly determined on the basis of the angle of the camera—except in extremely thick fog and heavy rain.

Figure 3:
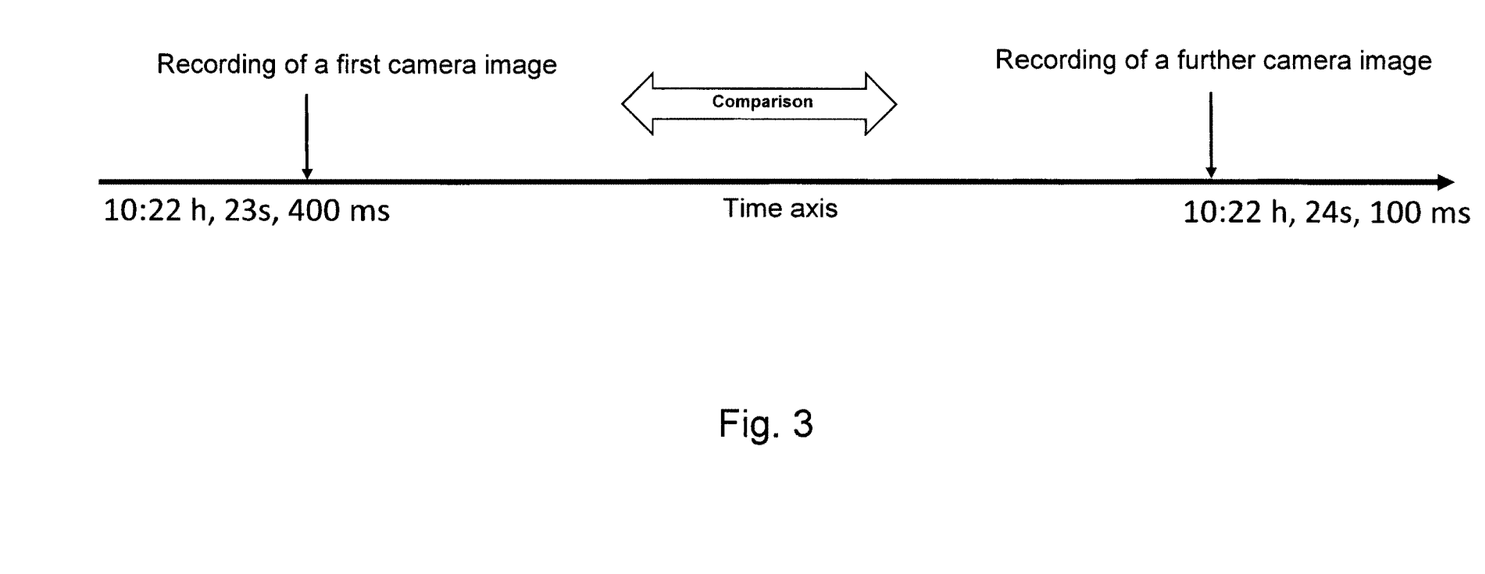
FIG. 3: shows a schematic representation of a timeline in order to clarify the chronology of two images recorded in chronological succession according to an exemplary embodiment of the present invention.

FIG. 3 shows a schematic representation of a timeline in order to clarify the chronology of two images recorded in chronological succession according to an exemplary embodiment of the present invention.

FIG. 3 shows a comparison of two consecutive images. This can also be a method so as to recognize a freezing of the image processing system or respectively an image loss of the image processing system.

Images recorded consecutively in time by the camera system are to be stored and these consecutively recorded images are subsequently compared with one another in the computer system, using software-based image processing methods.

Figure 4:
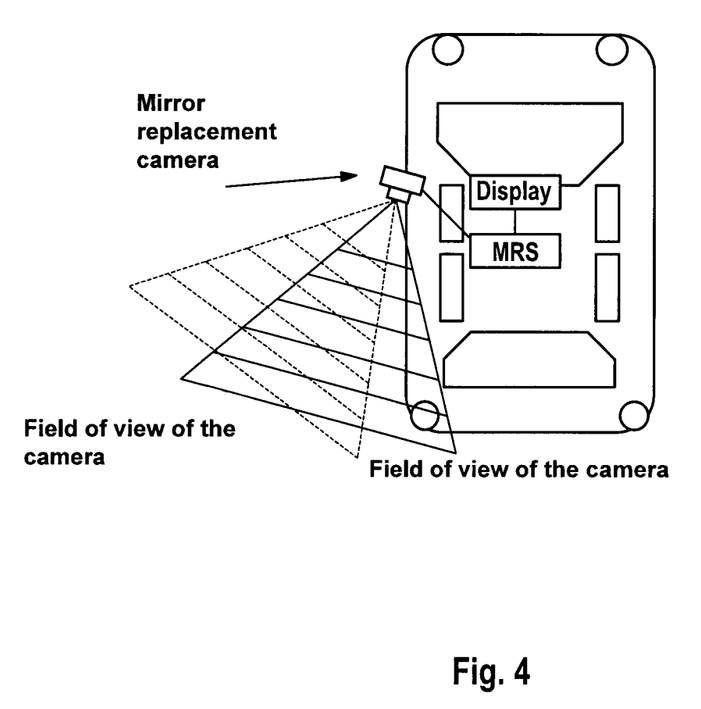
FIG. 4: shows a schematic representation of an exemplary modification of the camera lens having another viewing range according to another exemplary embodiment of the present invention.

FIG. 4 shows a schematic representation of an exemplary modification of the camera lens having another viewing range according to another exemplary embodiment of the present invention.

FIG. 4 indicates, by way of example, that during the movement of the camera another field of view—which deviates from the field of view of the first image—is created.

Figure 5:
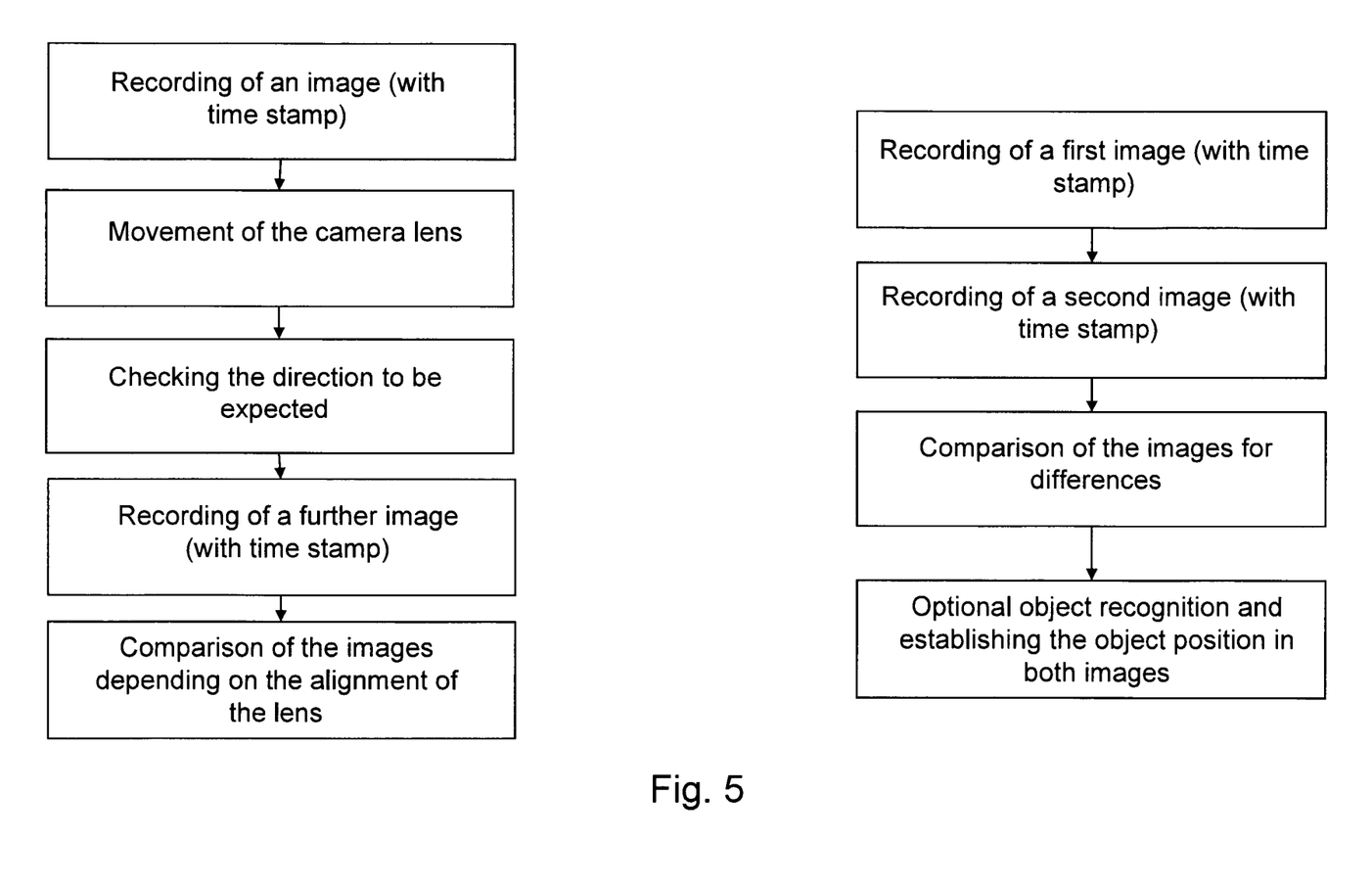
FIG. 5: shows a schematic representation of a flow chart of a method for checking the playback of a video sequence of a mirror replacement camera according to another exemplary embodiment of the present invention.

FIG. 5 shows a schematic representation of a flow chart of a method for checking the playback of a video sequence of a mirror replacement camera according to another exemplary embodiment of the present invention.

FIG. 5 shows a possible difficulty during the simple comparison of images of recorded images over time.

If, for example, a vehicle is to drive out of a parking place or parking space, it can happen that at the time of the recording, few or no moving objects at all can be recognized in the field of view of the camera.

As shown in the diagram, the camera records images consecutively in time and compares these recorded images.

In this case, the camera does not find any difference—it may be that the camera monitor system has frozen or not, i.e. there may not be any movement of the represented objects.

Figure 6:
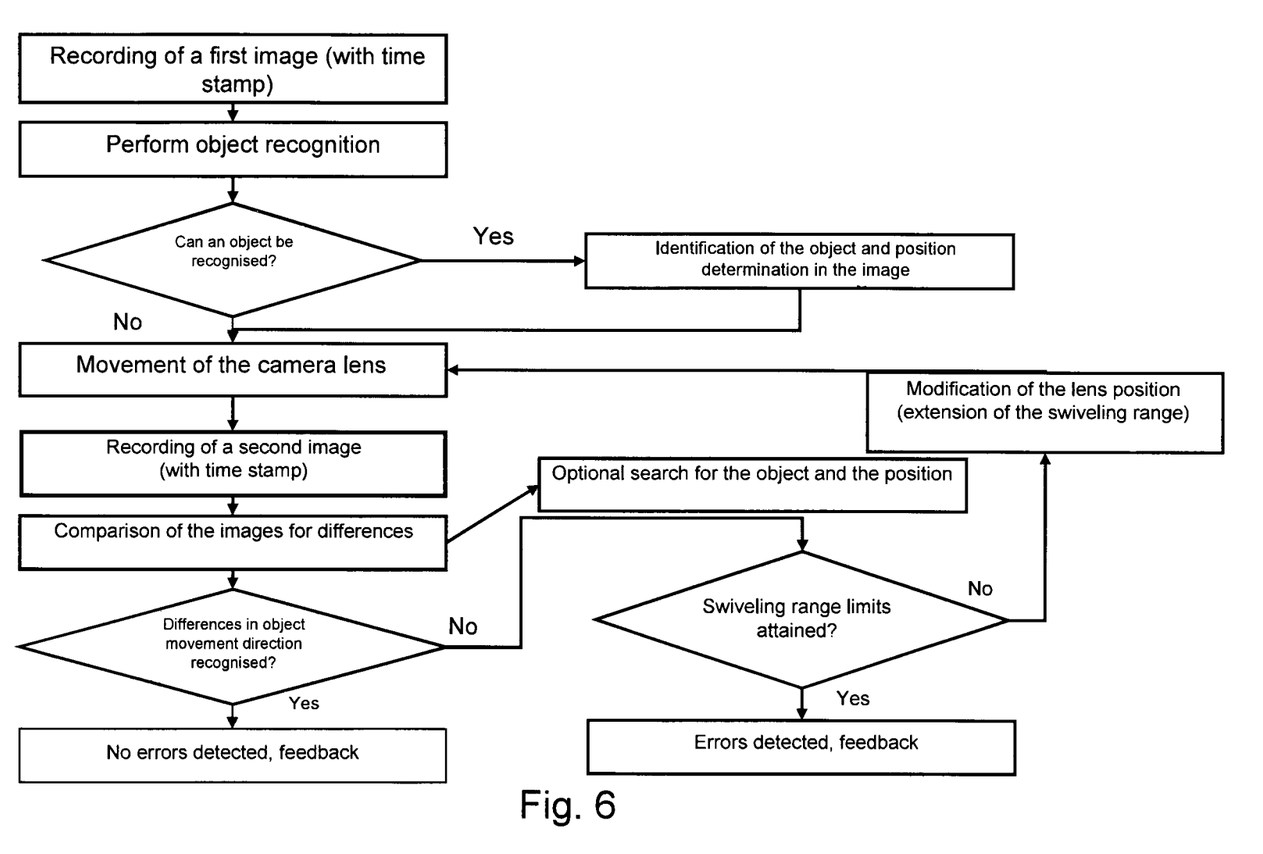
FIG. 6: shows a schematic representation of a flow chart of a method for checking the playback of a video sequence of a mirror replacement camera according to another exemplary embodiment of the present invention.

FIG. 6 shows a schematic representation of a flow chart of a method for checking the playback of a video sequence of a mirror replacement camera according to another exemplary embodiment of the present invention.

Figure 7:
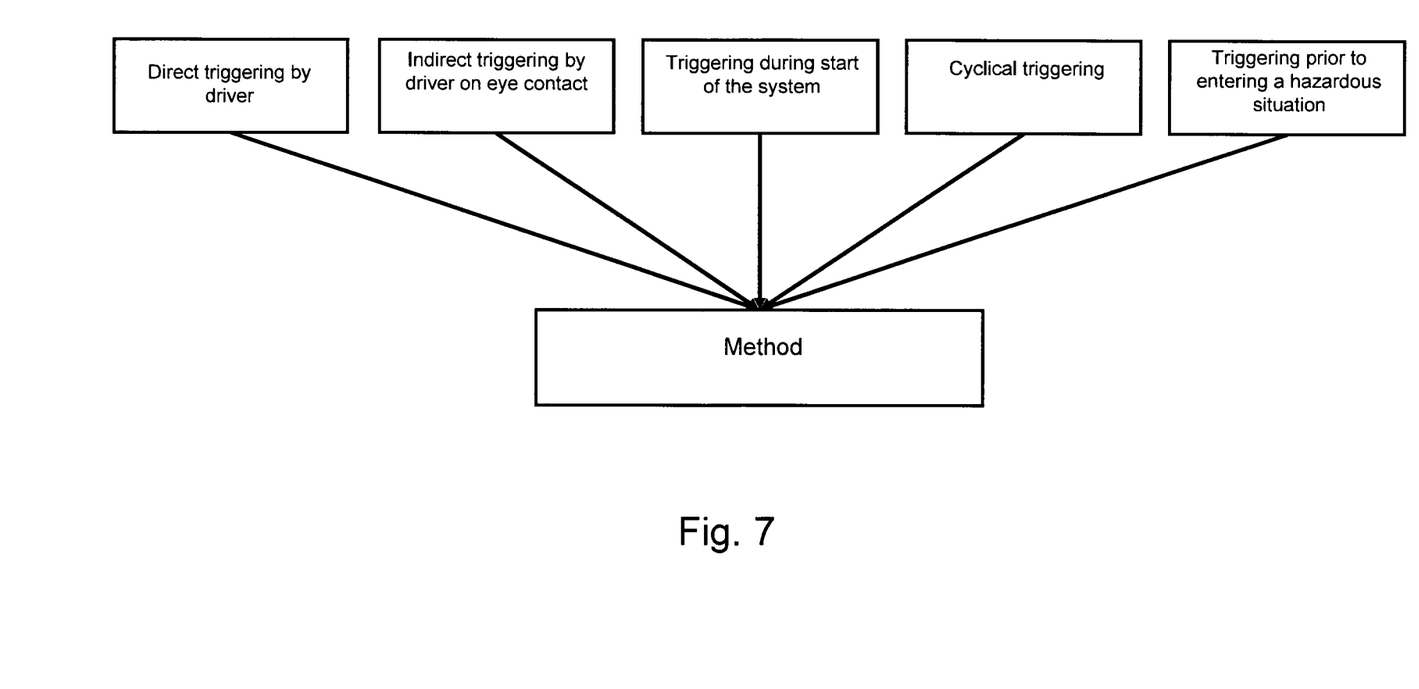
FIG. 7: shows a schematic representation of a flow chart of a method for checking the playback of a video sequence of a mirror replacement camera according to another exemplary embodiment of the present invention.

FIG. 7 shows possible triggering events, also called "triggers", for triggering the method for checking the playback of a video sequence of a mirror replacement camera according to another exemplary embodiment of the present invention.

FIG. 7 shows an embodiment of the present invention, in which recordings or images of specific parts or partial regions of the vehicle side are to be utilized so as to recognize movements more quickly and securely.

Figure 8:
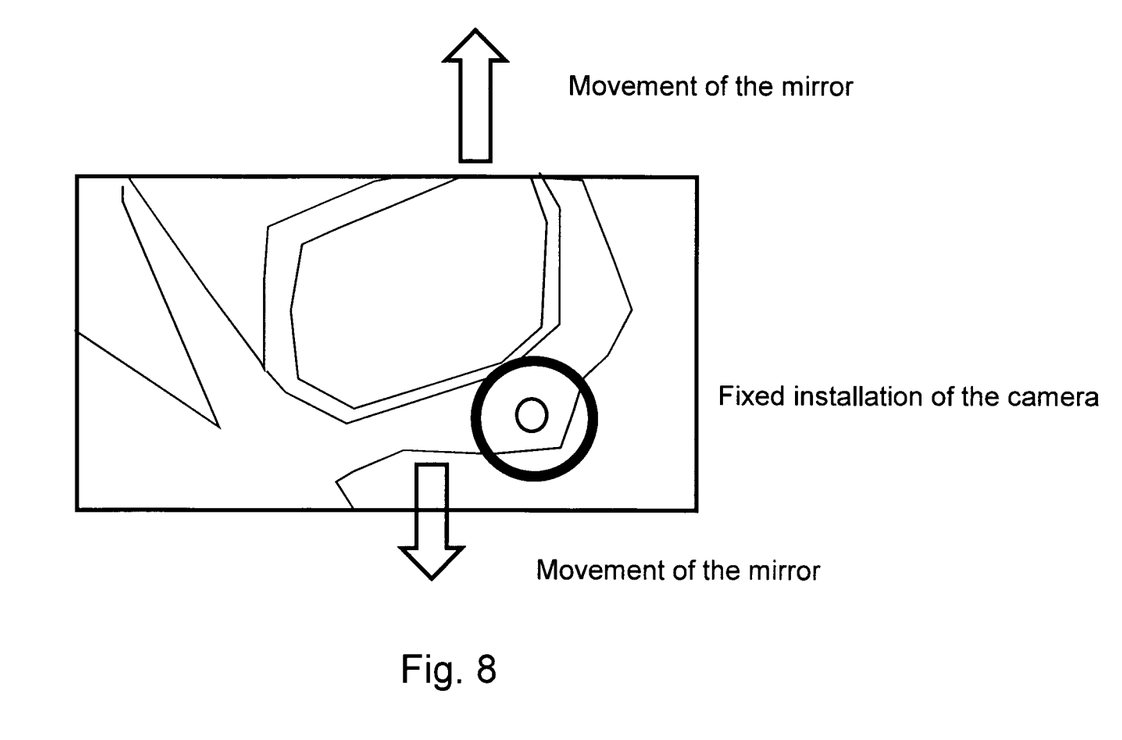
FIG. 8: shows a schematic representation of a possibility of an installation of the mirror replacement camera according to another exemplary embodiment of the present invention.

FIG. 8 shows a further possibility if the camera is fixed in a holding device, in this case a mirror.

In accordance with an exemplary embodiment of the present invention, it can be provided that the camera is moved or respectively the freezing of the image processing and display process in the mirror replacement system is recognized by way of the mirror adjustment.

Figure 9:
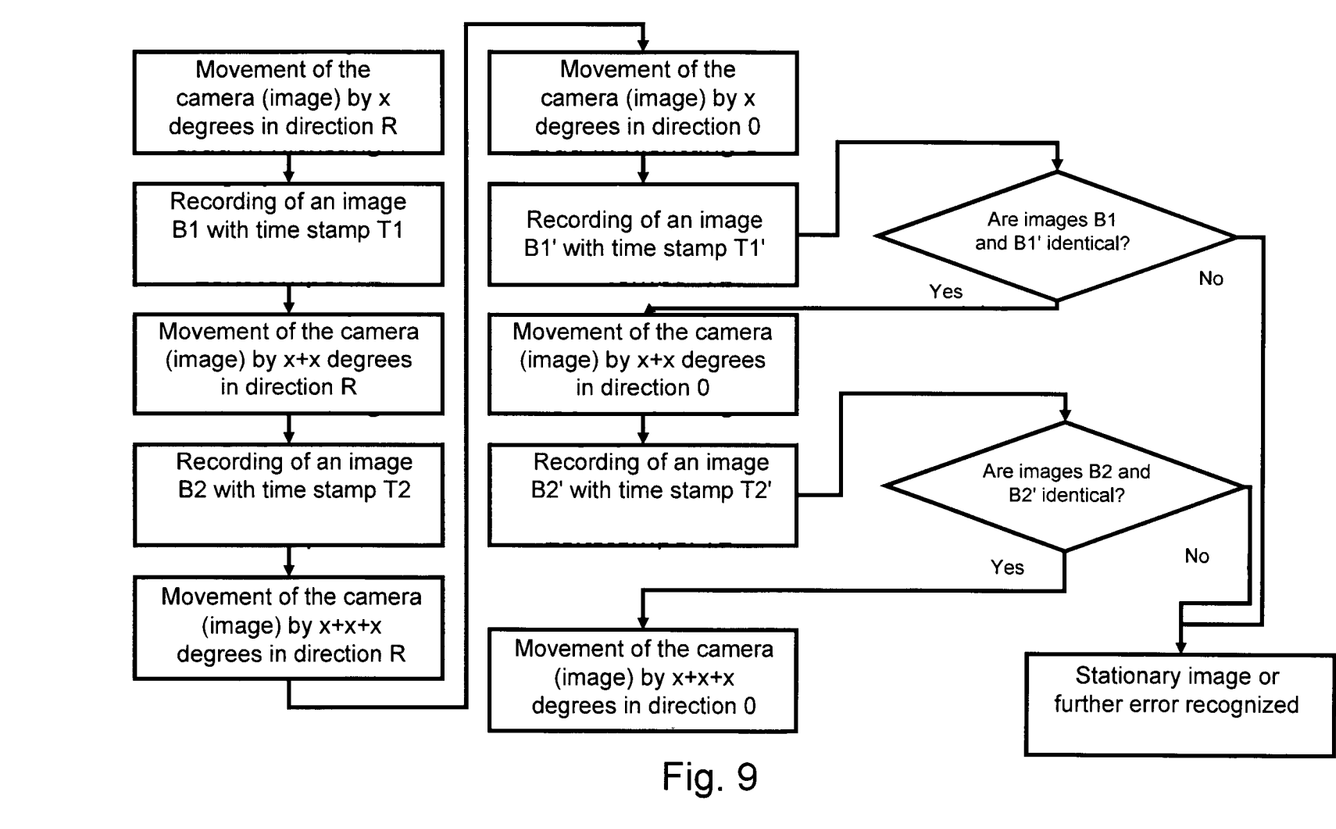
FIG. 9: shows a schematic representation of a flow chart of a method for checking the playback of a video sequence of a mirror replacement camera according to another exemplary embodiment of the present invention.

FIG. 9 shows a schematic representation of a flow chart of a method for checking the playback of a video sequence of a mirror replacement camera according to another exemplary embodiment of the present invention.

FIG. 9 shows a sequence chart for recognizing an error in the image by adjusting the camera.

FIG. 9 shows the result of the method. Since the camera is generally, in all probability, recording the ego vehicle or at least parts of the ego vehicle, a difference can also be clearly recognized here, for instance in the event that a turn signal light has been operated. Marking points could also be optionally affixed to the vehicle.

Figure 10:
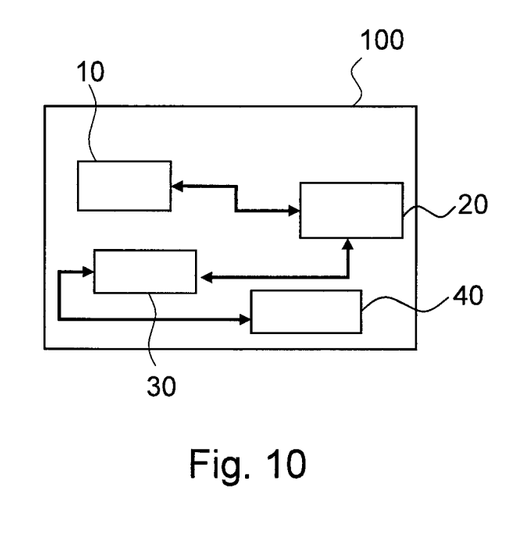
FIG. 10: shows a schematic representation of an apparatus for checking the playback of a video sequence of a mirror replacement camera according to another exemplary embodiment of the present invention.

FIG. 10 shows a schematic representation for checking the playback of a video sequence of a mirror replacement camera for a motor vehicle according to another exemplary embodiment of the present invention.

The apparatus 100 for checking the playback of a video sequence of a mirror replacement camera for a motor vehicle comprises a camera device 10, an image data processing device 20, an output device 30, and a diagnosis device 40.

The movable camera device 10 is designed to record an image and to provide image data.

The image data processing device 20 is coupled to the camera device 10 and designed to produce the video sequence on the basis of the captured image data.

The output device 30 is designed to display the produced video sequence.

The diagnosis device 40 is designed to move the camera device 10 and/or to generate an image movement when producing the video sequence so as to check the displayed video sequence.

Figure 11:
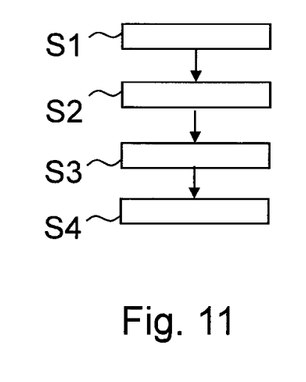
FIG. 11: shows a schematic representation of a flow chart of a method for checking the playback of a video sequence of a mirror replacement camera according to another exemplary embodiment of the present invention.

FIG. 11 shows a schematic representation of a flow chart of a method for checking the playback of a video sequence of a mirror replacement camera for a motor vehicle according to another exemplary embodiment of the present invention.

The method for checking the playback of a video sequence of a mirror replacement camera for a motor vehicle comprises the following method steps:

As a first method step, an image is captured S1 and image data is provided by means of a movable camera device 10.

As a second method step, the video sequence is produced on the basis of the captured image data.

As a third method step, the produced video sequence is displayed S3.

As a fourth method step, the camera device 10 is moved S4 and/or an image movement is generated when producing the video sequence so as to check the displayed video sequence.

Although the present invention has been described above on the basis of preferred exemplary embodiments, it is not restricted to these, but can be modified in many ways. In particular, the invention can be amended or modified in multiple ways, without deviating from the core of the invention.

In addition, it is pointed out that "comprising" and "having" do not exclude any other elements or steps and "a" or "one" does not exclude a plurality.

It is additionally pointed out that features or steps, which have been described with reference to one of the above exemplary embodiments, can also be used in combination with other features or steps of other exemplary embodiments described above. Reference numerals in the claims are not to be viewed as restrictions.

The invention claimed is:

1. A system for a motor vehicle, the system comprising:
    a mirror replacement camera comprising a camera device, which is mounted on the motor vehicle and is configured to record images and to provide corresponding image data;
    an image data processing device, which is coupled to the camera device and is configured to produce a video sequence based on the image data;
    an output device, which is configured to display the video sequence; and
    a diagnosis device, which is configured to produce an image movement in the recorded images by moving the camera device or a lens thereof or by generating the image movement in the producing of the video sequence, so as to check whether the video sequence has frozen by evaluating the video sequence before and after the image movement;
    wherein the diagnosis device is configured to perform the check of the video sequence when an eye contact of an occupant of the motor vehicle with the output device has been captured.

2. The system according to claim 1, wherein the diagnosis device is configured to perform the check of the video sequence repeatedly at predetermined periods of time.

3. The system according to claim 1, wherein the diagnosis device is configured to perform the check of the video sequence dependent on a prevailing driving situation and/or a prevailing vehicle state.

4. The system according to claim 1, wherein the camera device is configured to move a field of view of the camera device so as to produce the image movement.

5. A method of monitoring a mirror replacement system for a motor vehicle, the method comprising the steps:
 recording images and providing corresponding image data by a camera device mounted on the motor vehicle;
 producing a video sequence based on the image data;
 displaying the video sequence;
 detecting whether an occupant of the motor vehicle makes an eye contact with the output device; and
 when the eye contact has been detected, checking whether the video sequence has frozen by producing an image movement in the recorded images by moving the camera device or a lens thereof or by generating the image movement in the producing of the video sequence, and evaluating the video sequence before and after the producing of the image movement.

6. The system according to claim 1, wherein the camera device is movable, and the diagnosis device is configured to produce the image movement by moving the camera device.

7. The system according to claim 1, wherein the diagnosis device is configured to produce the image movement by moving the lens of the camera device.

8. The system according to claim 1, wherein the diagnosis device is configured to produce the image movement by generating the image movement in the producing of the video sequence.

9. The system according to claim 1, wherein the diagnosis device is configured to perform the evaluating of the video sequence by comparing the video sequence after the image movement with the video sequence before the image movement to determine whether differences resulting from the image movement can be detected.

10. A method of monitoring a sensor output of a sensor system of a motor vehicle, comprising steps:
 a) with a sensor device of the motor vehicle, producing a succession of sensor outputs;
 b) with a data processor device of the motor vehicle, producing a data sequence based on the succession of sensor outputs;
 c) with a display device of the motor vehicle, displaying a display output based on the data sequence;
 d) detecting whether an occupant of the motor vehicle makes an eye contact with the display device; and
 e) when the eye contact has been detected, checking whether the data sequence produced by the data processor device has frozen, by changing an effective sensing direction of the sensor device, continuing the steps a) and b), and comparing the data sequence after the changing of the effective sensing direction with the data sequence before the changing of the effective sensing direction, to determine whether a difference is detected in the data sequence after as compared with before the changing of the effective sensing direction.

11. The method according to claim 10, wherein the sensor device comprises a camera, and the sensor outputs comprise camera images.

12. The method according to claim 10, wherein the sensor device comprises a radar sensor.

13. The method according to claim 10, wherein the sensor device comprises an ultrasound sensor.

14. The method according to claim 10, wherein the changing of the effective sensing direction comprises physically moving the sensor device relative to a vehicle body of the motor vehicle.

15. The method according to claim 10, wherein the changing of the effective sensing direction comprises moving a lens of the sensor device to a different orientation.

16. The method according to claim 10, wherein the changing of the effective sensing direction comprises redirecting a field of view of the sensor device.

17. The method according to claim 10, wherein the changing of the effective sensing direction comprises orienting a field of view of the sensor device to encompass a portion of a vehicle body of the motor vehicle.

18. The method according to claim 10, further comprising automatically remedying a freeze error upon determining that the data sequence produced by the data processor device has frozen.

* * * * *